(12) United States Patent
Hong et al.

(10) Patent No.: US 6,923,023 B2
(45) Date of Patent: Aug. 2, 2005

(54) METHODS AND APPARATUSES FOR CONTROLLING OPTICAL FIBER PRIMARY COATING DIAMETER

(75) Inventors: Siu-Ping Hong, Alpharetta, GA (US); Jason W. Shiroishi, Decatur, GA (US); Nirupama Kenkare, Tucker, GA (US)

(73) Assignee: Fitel U.S.A. Corporation, Norcross, GA (US)

(*) Notice: Subject to any disclaimer, the term of this patent is extended or adjusted under 35 U.S.C. 154(b) by 485 days.

(21) Appl. No.: 10/261,908

(22) Filed: Oct. 1, 2002

(65) Prior Publication Data

US 2004/0060323 A1 Apr. 1, 2004

(51) Int. Cl.⁷ ............................................. C03B 37/07
(52) U.S. Cl. ..................... 65/377; 65/382; 65/432; 65/491; 65/484; 118/688; 118/694; 427/8; 427/9; 427/10; 427/163.2; 427/407.2
(58) Field of Search ....................... 65/377, 382, 432, 65/491, 484; 118/688, 694, 692, 693; 427/8, 9, 10, 163.2, 407.2

(56) References Cited

U.S. PATENT DOCUMENTS

| | | | | |
|---|---|---|---|---|
| 4,011,070 A | * | 3/1977 | Hynd | .................... 65/29.17 |
| 4,582,520 A | * | 4/1986 | Sturm | ........................ 65/382 |
| 4,617,872 A | * | 10/1986 | Melliger | ..................... 118/19 |
| 5,469,149 A | * | 11/1995 | Binner et al. | ............... 340/677 |
| 6,494,645 B1 | * | 12/2002 | Seitz et al. | ................... 406/24 |
| 6,579,563 B1 | * | 6/2003 | Dillon | .......................... 427/8 |
| 2003/0211236 A1 | * | 11/2003 | Workman et al. | ........ 427/163.2 |
| 2004/0067037 A1 | * | 4/2004 | Tausch et al. | .............. 385/141 |

* cited by examiner

Primary Examiner—John Hoffmann
(74) Attorney, Agent, or Firm—Sutherland Asbill & Brennan LLP (57) ABSTRACT

Methods and apparatuses estimate and control optical fiber primary coating diameter for wet-on-wet optical fiber manufacturing. The primary coating diameter for a particular length of optical fiber is calculated based upon a measurement of the weight of primary and/or secondary coating material consumed during optical fiber manufacturing. Control of the primary coating diameter is effected by a coating controller which can increase or decrease the primary coating diameter through control of glass temperature, coating viscosity and/or other parameters during wet-on-wet fiber manufacture.

8 Claims, 6 Drawing Sheets

METHODS AND APPARATUSES FOR CONTROLLING OPTICAL FIBER PRIMARY COATING DIAMETER

FIELD OF THE INVENTION

The present invention relates generally to methods and apparatuses for controlling optical fiber primary coating diameter, and more particularly, to methods and apparatuses for estimating and controlling optical fiber coating diameter for wet-on-wet optical fiber manufacturing.

BACKGROUND OF THE INVENTION

Communications and data transmission systems that transmit information signals in the form of optical pulses over optical fiber are now commonplace, and optical fibers have become the physical transport medium of choice in long distance telephone and data communication networks due to their signal transmission capabilities, which greatly exceed those of mechanical conductors. Despite their advantages, however, difficulties in their manufacture must be overcome in order for high-yield, high-quality and error-free optical fiber to be produced in mass. One such manufacturing problem is maintaining the appropriate thickness and concentricity of optical fiber layers.

Figure 1:
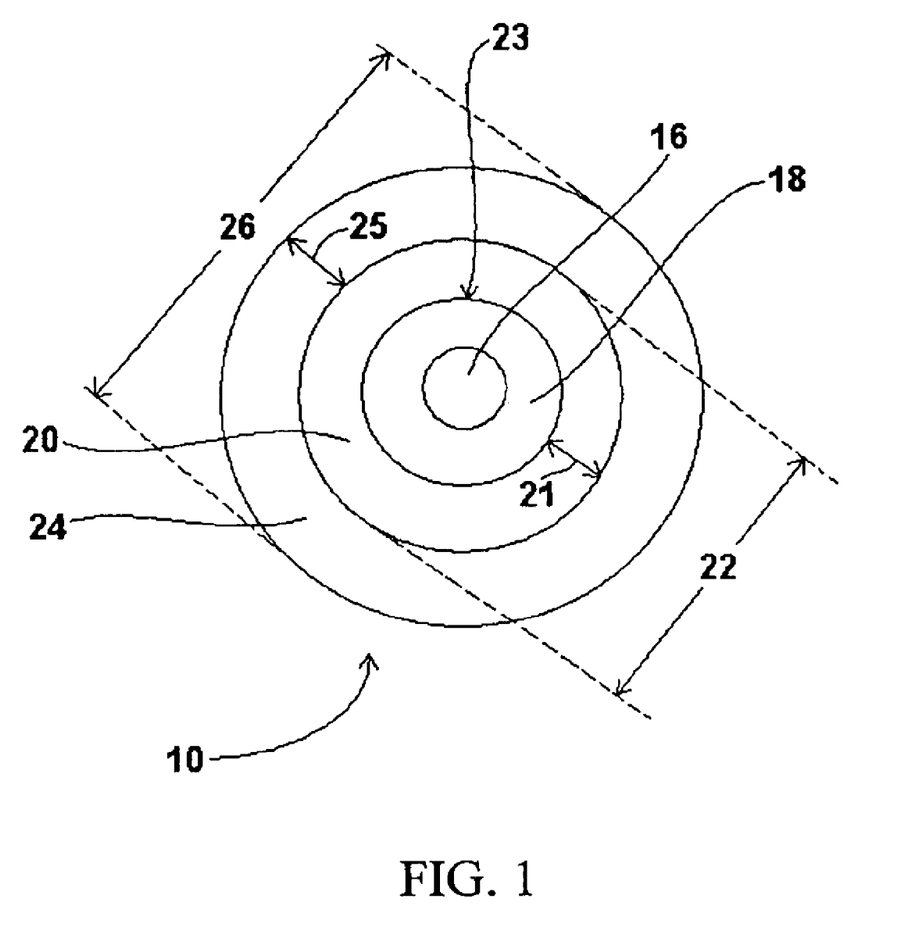
FIG. 1 shows the cross section of an optical fiber, according to the prior art.

As shown by the optical fiber cross-section illustrated FIG. 1, the production of optical fiber 10 traditionally utilizes a minimum of two layers of coating 20, 24 covering a glass center 18 having a core 16, as is well known in the art. The two layers of coating 20, 24 comprise an inner, or primary, layer of coating 20, and an outer, or secondary, layer of coating 24. In many circumstances maintaining control of the thickness 21 of the primary layer of coating 20 is of critical importance when considering fiber performance parameters such as microbending loss and modulus. In wet-on-wet coating applications, in which the application of the primary layer of coating 20 is immediately followed by application of the secondary layer of coating 24, which is applied directly over the viscous, still-wet primary layer of coating 20, no technique exists by which to measure the primary outer diameter (POD) 22 of the primary layer of coating 20 online during the drawing of the fiber 10.

Controlling the POD 22 is essential to producing optical fiber to within prescribed limits, thus ensuring acceptable levels of optical fiber performance. Currently, however, controlling the POD 22 assumes that the die geometry, coating viscosity and coated fiber outer diameter are all consistent and known. Any variability in these parameters will cause variability in the POD 22. At present, this variability cannot be measured during the drawing of the optical fiber (also referred to herein as 'online'), and therefore cannot be corrected until after the fiber is formed.

Therefore, what is needed is a system, method and apparatus to estimate and control optical fiber primary coating diameter in wet-on-wet fiber manufacturing.

BRIEF SUMMARY OF THE INVENTION

Methods and apparatuses of the present invention estimate and control optical fiber primary coating diameter for wet-on-wet optical fiber manufacturing. Using the present invention the primary coating diameter for a particular length of optical fiber is calculated based upon a measurement of the weight of primary and/or secondary coating material consumed during optical fiber manufacturing. Additionally, control of the primary coating diameter is effected by a coating controller which can increase or decrease the primary coating diameter through control of glass temperature, coating viscosity and/or other parameters during wet-on-wet optical fiber manufacture.

According to one embodiment of the invention, there is disclosed an apparatus which estimates and controls optical fiber primary coating diameter during optical fiber manufacturing. The apparatus includes at least one tank, where the at least one tank stores coating material applied to a glass fiber during optical fiber manufacturing, and at least one scale, upon which the at least one tank rests, where the at least one scale is operable to measure the difference in the weight of the coating material as it is consumed during the optical fiber manufacturing.

According to one aspect of the invention, the apparatus further includes an estimator in electrical communication with the at least one scale, wherein the estimator is operable to utilize the measure of the weight of the coating material consumed during optical fiber manufacturing to estimate the primary outer diameter of the manufactured optical fiber. According to another aspect of the invention, the apparatus also includes a draw tower in electrical communication with the estimator, where the draw tower manufactures the optical fiber. According to yet another aspect of the invention, the draw tower is operable to provide to the estimator a measure of the length of optical fiber manufactured, and the estimator is operable to estimate the primary outer diameter of the manufactured optical fiber based at least in part upon the length of optical fiber manufactured and the weight of the coating material consumed during optical fiber manufacturing.

The estimator is also operable to estimate the primary outer diameter of optical fiber during wet-on-wet optical fiber manufacturing. Furthermore, the estimator is configured to estimate the primary outer diameter of the optical fiber manufactured based at least in part upon an estimate of the diameter of the glass center of the optical fiber. Moreover, the estimator can be configured to estimate the primary outer diameter of the optical fiber manufactured based at least in part upon an estimate of the diameter of the outer coating of the optical fiber.

According to another aspect of the invention, the apparatus can further include a comparator in electrical communication with the estimator, where the comparator determines the error in the primary outer diameter of the manufactured optical fiber based upon a target primary outer diameter and the estimated primary outer diameter received from the estimator. The apparatus can also include a controller, in electrical communication with the draw tower to control the operation of the draw tower. Additionally, the controller may be in electrical communication with the comparator and use the error in the primary outer diameter to adjust at least one optical fiber manufacturing parameter selected from the group consisting of helium flow rate, primary coating viscosity, primary coating pressure, secondary coating viscosity, and secondary coating pressure. Furthermore, the controller can use the error in the primary outer diameter to control the primary outer diameter of the manufactured optical fiber.

According to another embodiment of the present invention, there is disclosed a method for estimating and controlling optical fiber primary coating diameter during optical fiber manufacturing. The method includes storing coating material in at least one tank, applying the coating material to a glass fiber during optical fiber manufacturing, providing at least one scale, upon which the at least one tank rests, and measuring, using the at least one scale, the difference in the weight of the coating material as it is consumed during the optical fiber manufacturing.

According to one aspect of the invention, the method also includes the step of utilizing the measure of the weight of the coating material consumed during optical fiber manufacturing to estimate the primary outer diameter of the manufactured optical fiber. According to another aspect of the present invention, the method further includes the step of receiving, from a draw tower, a measure of the length of optical fiber manufactured. According to yet another aspect of the invention, the primary outer diameter is estimated during wet-on-wet optical fiber manufacturing.

According to another aspect of the invention, the step of utilizing the weight of the coating material consumed during optical fiber manufacturing to estimate the primary outer diameter of the manufactured optical fiber includes estimating the primary outer diameter of the manufactured optical fiber based at least in part upon the length of optical fiber manufactured and the weight of the coating material consumed during optical fiber manufacturing. The step of utilizing the weight of the coating material consumed during optical fiber manufacturing to estimate the primary outer diameter of the manufactured optical fiber can also include estimating the primary outer diameter of the manufactured optical fiber based at least in part upon an estimate of the diameter of the glass center of the optical fiber. Additionally, the step of utilizing the weight of the coating material consumed during optical fiber manufacturing to estimate the primary outer diameter of the manufactured optical fiber can include estimating the primary outer diameter of the manufactured optical fiber based at least in part upon an estimate of the diameter and thickness of the outer coating of the optical fiber.

The method of the present invention can also include the step of determining the error in the primary outer diameter of the manufactured optical fiber based upon a target primary outer diameter and the estimated primary outer diameter. Furthermore, the error in the primary outer diameter may be used to control the primary outer diameter of the manufactured optical fiber.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 2:
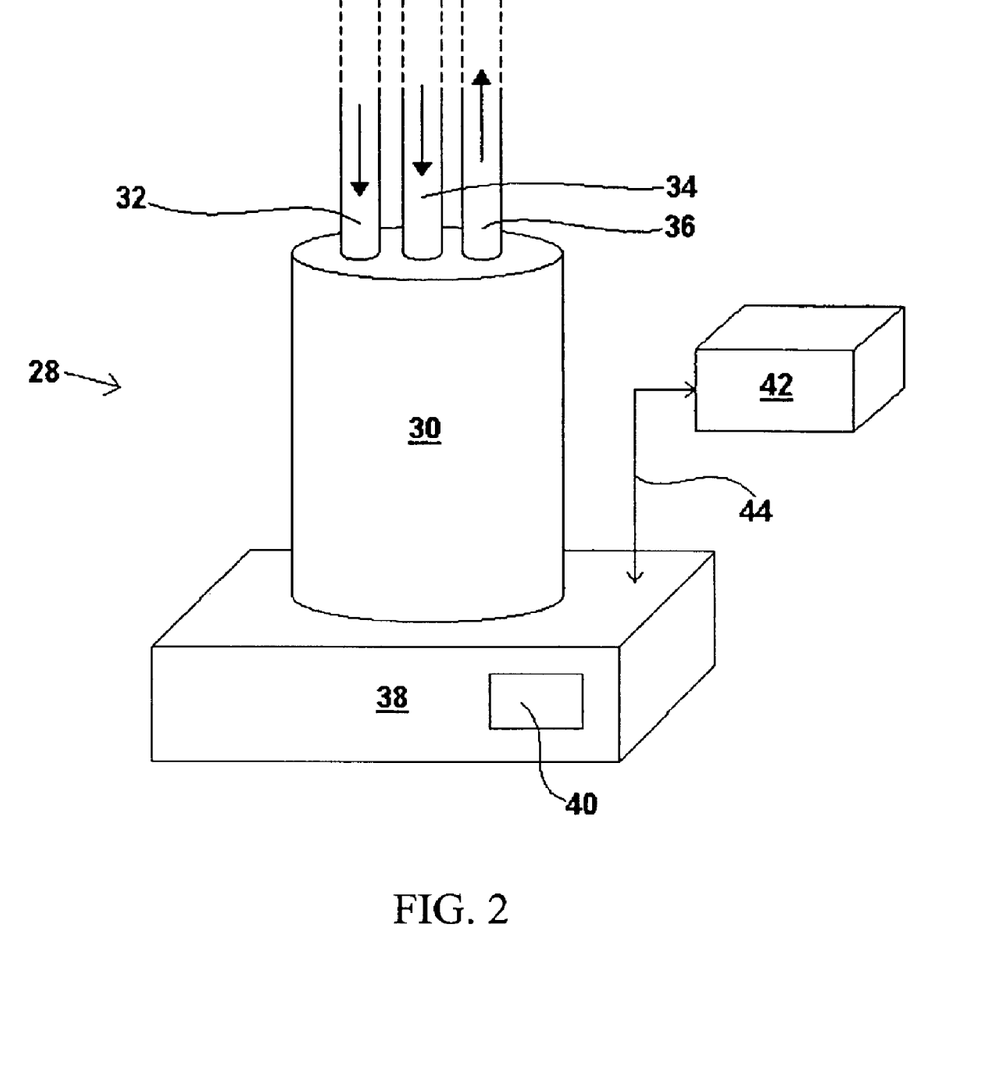
FIG. 2 shows an apparatus for applying primary coating, according to one embodiment of the present invention.

FIG. 2 shows an apparatus 28 for applying primary coating and for estimating the POD of a wet-on-wet optical fiber online, according to one embodiment of the present invention. The apparatus 28 generally comprises a tank 30, scale 38, POD estimator 42, pressure supply 32, coating line 34, and coating applicator 36. The coating line 34 initially fills the tank 30 with a primary coating material that forms the optical fiber's primary layer of coating. Then, during formation of the optical fiber the primary coating material is driven from the tank 30 by the applied pressure from pressure supply 32, out of the coating applicator 36 and onto the glass center of the optical fiber. This process creates a change in mass of the primary coating material inside the tank 30, which is registered by the scale 38 as a weight change.

Referring again to the optical fiber cross section illustrated in FIG. 1, the consumed primary coating material ultimately creates a long cylinder in the optical fiber 10, where the inner diameter 23 of the cylinder is defined by the outer diameter of the glass center 18. Typically, due to manufacturing processes known to those of skill in the art, the diameter of the glass center 18 is a known value having very low variability, such as ±1 µm. Because the glass diameter is known, as is the density of the primary coating material, the length of fiber produced, and the difference in the mass of the primary coating material consumed by the process, the POD may be calculated using a mass/volume equation:

$$POD_P = \sqrt{\frac{4(W_P)}{\pi(\rho_P L)} + (glass\ diameter)^2} \qquad [1]$$

where $W_P$ is the weight difference in the mass of the primary coating material consumed by the process (in grams), $\rho_P$ is the density of the primary coating material (in grams/cc), L is the length of optical fiber created during the consumption of the primary coating material, and the glass diameter is the diameter of the glass center 18, which is roughly equal to the inner diameter 23 of the cylinder created by the primary coating material. In actuality, it will be appreciated that this equation calculates the average POD over a length (L) of optical fiber because it considers the amount of primary coating material used to generate a length L of optical fiber.

The calculation of POD shown above includes a 'P' subscript to indicate that the measurement is based on density of the primary coating material. According to another embodiment of the present invention, an alternative mass/volume equation having different known parameters may also be used to calculate POD:

$$POD_S = \sqrt{(SOD)^2 - \frac{4(W_S)}{\pi(\rho_S L)}} \qquad [2]$$

where $W_S$ is the weight difference in the mass of the secondary coating material consumed by the process (in grams), $\rho_P$ is the density of the secondary coating material (in grams/cc), L is the length of optical fiber created during the consumption of the secondary coating material, and SOD is the secondary outer diameter, which is the outer diameter 26 of the secondary coating layer 24. Because the weight difference in this calculation is of the secondary coating material, rather than the primary coating material, an apparatus like that of FIG. 2 is required for application of the secondary coating material. Therefore, a secondary coating material tank and secondary coating material input and output would effectively operate the same as corresponding parts in the apparatus of FIG. 2, only with secondary coating material, which is applied to the primary coating layer 20. Like the former calculation, this calculation yields an average POD over a length L of optical fiber. However, because the latter equation uses the density and weight difference in the mass of secondary coating material, the POD includes an 'S' subscript to indicate that the measurement is based on the secondary coating material.

Although either of the above calculations can be used to calculate the average POD over a length of fiber, the first calculation ($POD_P$) is preferred because the value of the glass diameter used in the first formula is typically much more accurate than that of the SOD 26 used in the second formula. As noted above, the diameter of the glass center 18 is a known value having very low variability, such as ±1 μm. While the SOD 26 is also known, its variability is greater than that of the glass center 18, and is typically approximately ±5 μm.

Referring again to FIG. 2, according to one embodiment of the invention, the apparatus 28 for applying primary coating and for estimating the POD of a wet-on-wet optical fiber online includes a POD estimator 42. According to one aspect of the present invention, the POD estimator 42 is operable to calculate one or both of the above equations. As will be appreciated by one of ordinary skill in the art, the POD estimator 42 of the present invention may take the form of an entirely hardware embodiment, an entirely software embodiment or an embodiment combining software and hardware aspects. Furthermore, the POD estimator 42 may take the form of a computer program product on a computer-readable storage medium having computer-readable program code means embodied in the storage medium. Any suitable computer-readable storage medium may be utilized including hard disks, CD-ROMs, optical storage devices, or magnetic storage devices.

Preferably, the POD estimator 42 is in electrical communication 44 with the scale 38 and other components such that it receives each of the components necessary to calculate the average POD. For instance, the POD estimator 42 may receive the length of optical fiber L created during draw from one or more electrical signals received from the draw tower (not illustrated). As another example, the POD estimator 42 may receive the change in weight of the consumed coating material directly from the scale 38 in the form of electrical signals. Therefore, the POD estimator 42 is preferably operable to interface with other components of the optical fiber manufacturing system. However, the POD estimator 42 can also include one or more input devices such that an operator can directly input one or more necessary values for the computation of the POD. For instance, although the density of the primary and/or secondary coating material could be automatically received by the POD estimator 42, these values could be input directly into the POD estimator 42 by an operator.

According to one aspect of the invention, the POD estimator 42 is operable to collect and calculate both POD equations described above. Therefore, the POD estimator 42 may be in electrical communication with an apparatus 28 used to calculate the $POD_P$ and with a similar apparatus, as described with respect to the second equation, used to calculate the $POD_S$. Although the $POD_P$ value is preferred, as noted above, the POD estimator 42 may also be configured to calculate both the $POD_P$ and $POD_S$, and average the two values to produce a composite POD, $POD_C$, over the same length L of fiber:

$$POD_C = \frac{POD_P + POD_S}{2} \qquad [3]$$

One of ordinary skill in the art will readily recognize that analysis methodologies other than averaging the $POD_P$ and $POD_S$ values may be used with the present invention and, depending on the particular need, may be preferable to an average value. In some cases, a simple comparison of the two values has value. If an abnormal fluctuation occurs in one of the values, but not the other, there may be an indication that something is adversely influencing the data. This may occur, for example, if a wrench or other object is left on one of the tanks or scales causing the weight change for one of the tanks to be off.

Additionally, the POD estimator 42 may also accommodate for fluctuations in the difference in the mass of the applied pressure input into the tank 30 from the pressure supply 32, which can impact the accuracy of the scale's calculation in the change of weight of the coating material. Because the mass of air increases as the coating is consumed and pressure in the tank increases, the POD estimator 42 can reduce the measured weight of consumed coating material by the increase in weight of the increased pressure. The pressure maintained within the tank may also increase or decrease due to processing requirements. Compensating for these changes ensures an accurate measurement in the weight difference in the mass of the coating material consumed by the process (in grams).

Although the POD estimator 42 is preferably used to calculate the above equations, it will be appreciated that the equations may also be calculated by a system operator reading the weight of the tank 30 on a scale display 40. The operator can receive one or more additional known equation parameters from other system components and then manually calculate the POD according to the above equations.

Figure 3:
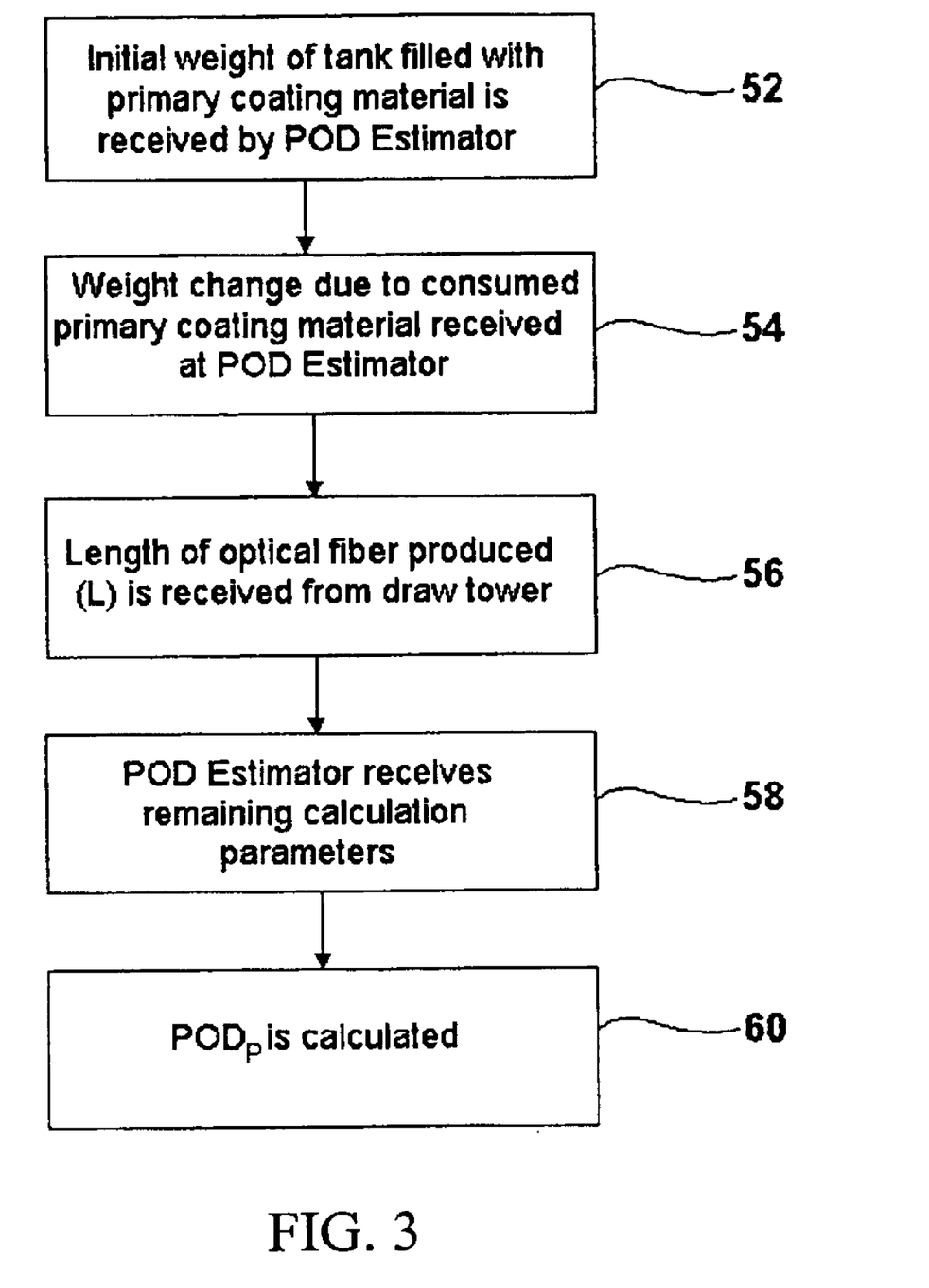
FIG. 3 shows a block diagram flow chart illustrating the estimation of the POD during draw, according to one embodiment of the present invention.
Figure 4:
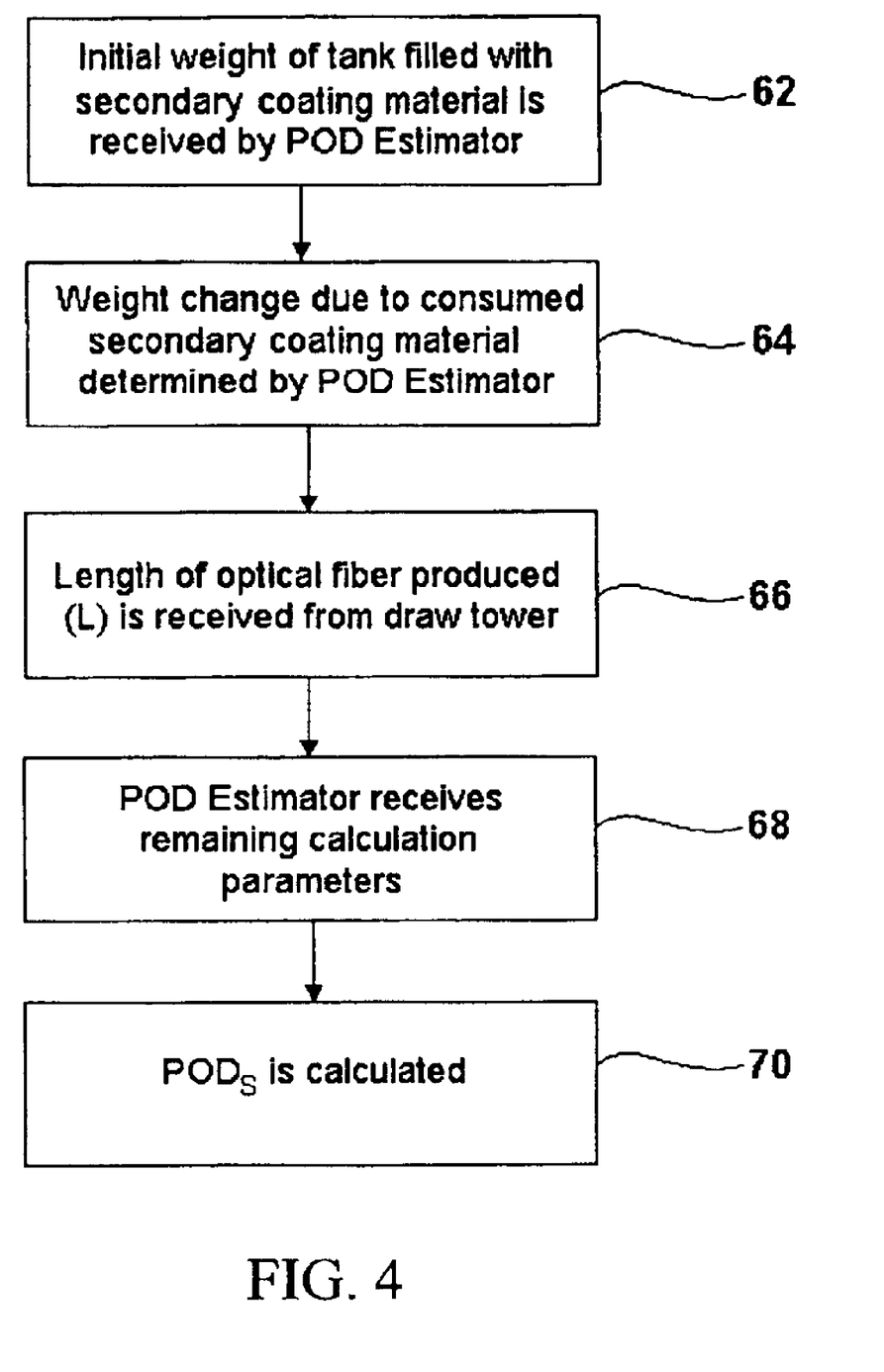
FIG. 4 shows a block diagram flow chart illustrating the estimation of the POD during draw, according to another embodiment of the present invention.

FIG. 3 shows a block diagram flow chart illustrating the estimation of the $POD_P$ by the POD estimator 42 during draw, according to one embodiment of the present invention. FIG. 4 shows a block diagram flow chart illustrating the estimation of the $POD_S$ by the POD estimator 42 during draw, according to another embodiment of the present invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Referring now to FIG. 3, the initial weight of the tank filled with primary coating material is received by the POD estimator 42 (block 52). Next, a length of optical fiber L is manufactured using primary coating material provided by the tank 30. The primary coating material is driven from the tank 30 by the applied pressure from pressure supply 32, out of the coating applicator 36 and onto the glass center of the optical fiber. This process creates a change in mass of the primary coating material inside the tank 30. The new weight of the tank with the reduced amount of primary coating material is registered by the scale 38 and this is sent to the POD estimator 42. Although the POD estimator takes the original and new weight, and calculates the weight change (block 54) to determine the weight of material used, it will be appreciated that this function may be performed by the scale 38. Additionally, the scale 38 may be configured such that it is at zero when full with coating material, such that a reduction of the weight measured by the scale will directly correspond with the amount of material consumed by the manufacturing process. Next, the length of optical fiber, L, is received from the draw tower (block 56). The remaining calculation parameters are then received by the POD estimator 42 (block 58). These parameters include the density of the primary coating material, pp, and the diameter of the glass center 18, which is roughly equal to the inner diameter 23 of the cylinder created by the primary coating material. Finally, the $POD_P$ is calculated according to equation [1], above (block 60).

Referring now to FIG. 4, the initial weight of a tank filled with secondary coating material is received by the POD estimator 42 (block 62). Next, a length of optical fiber L is manufactured using secondary coating material provided by the tank. The secondary coating material is driven from the tank by the applied pressure from a pressure supply, out of the coating applicator and onto the primary coating of the optical fiber. This process creates a change in mass of the secondary coating material inside the tank. The new weight of the tank with the reduced amount of secondary coating material is registered by the scale 38 and the this is sent to the POD estimator 42. As noted above, the difference in weight measured by the scale which corresponds with the amount of material consumed by the manufacturing process may be measured using a variety of methods known to those of skill in the art, and may be measured by the scale, POD estimator 42 (block 64), operator, or another component. Next, the length of optical fiber, L, is received from the draw tower (block 66). The remaining calculation parameters are then received by the POD estimator 42 (block 68). These parameters include the density of the secondary coating material, $\rho_S$, and the SOD 26 of the secondary coating layer 24. Finally, the $POD_S$ is calculated according to equation [2], above (block 70).

According to another embodiment of the present invention, because the methods and apparatuses described above can be used to calculate the average POD of an optical fiber during drawing of the fiber, this information can be used to control the POD during wet-on-wet optical fiber manufacture. Therefore, variations in die geometry and coating viscosity can be compensated for, such as by adjusting primary and/or secondary coating pressure, glass temperature, primary and/or secondary coating viscosity, and/or other manufacturing parameters.

Figure 5:
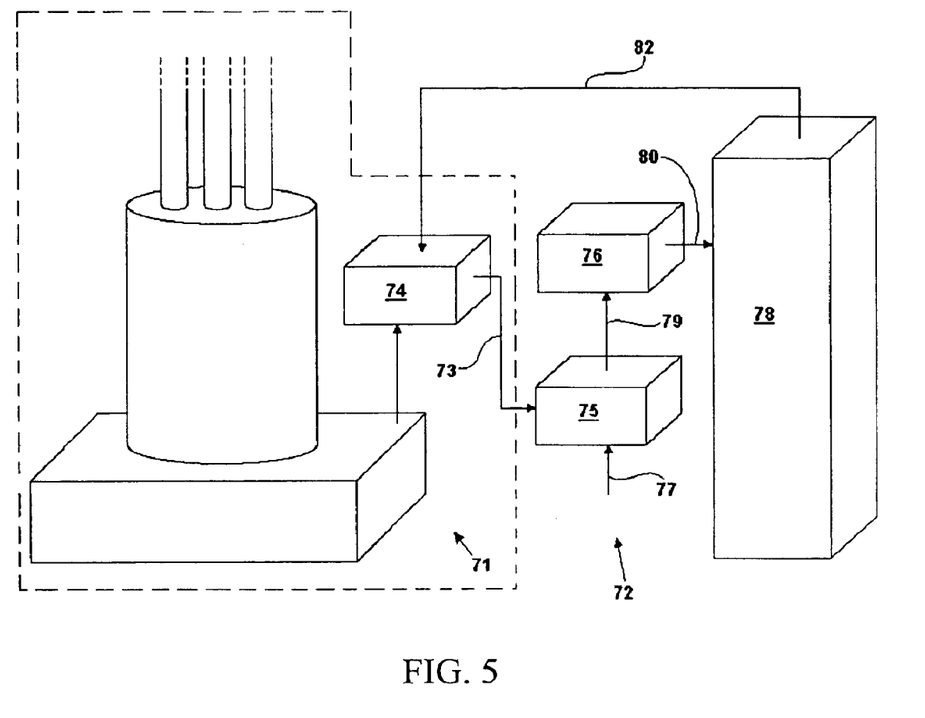
FIG. 5 shows an apparatus to control the POD during fiber draw, according to one embodiment of the present invention.
Figure 6:
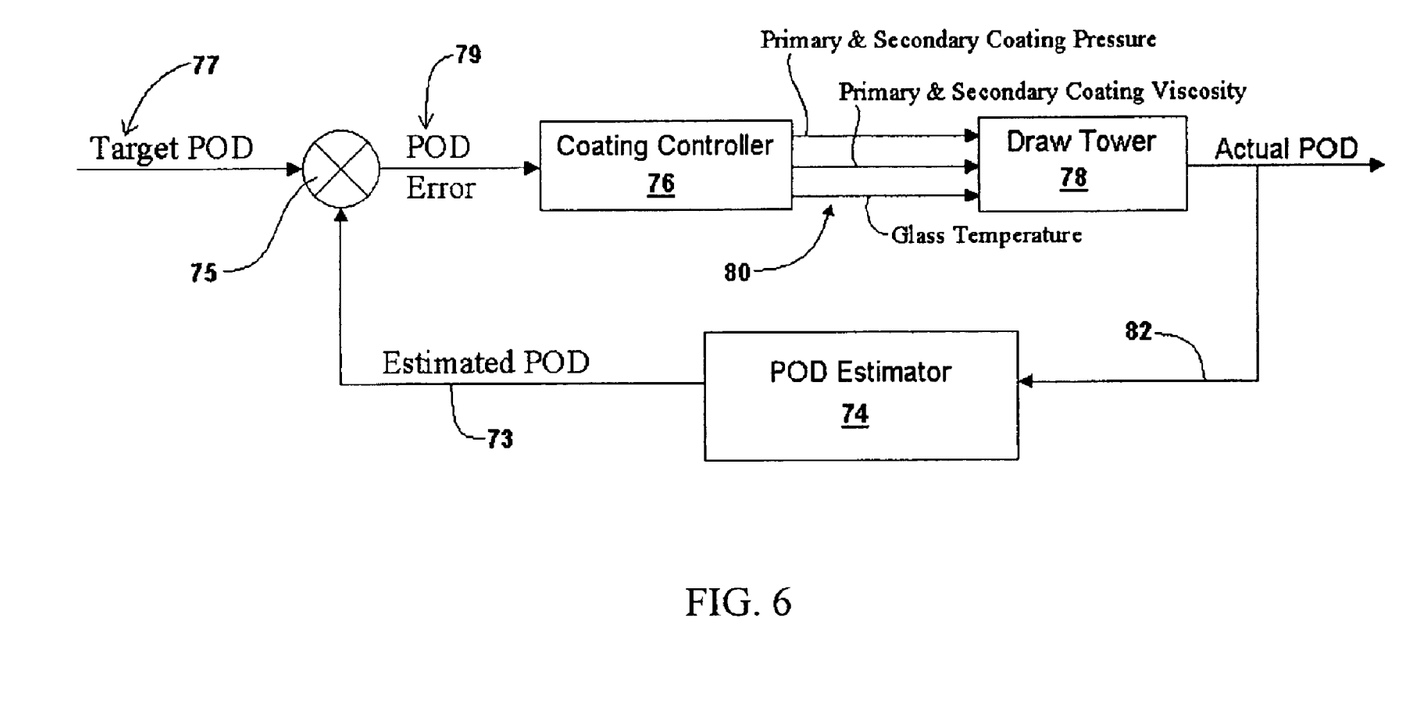
FIG. 6 shows a feedback loop illustrating the function of the apparatus illustrated in FIG. 5, according to one embodiment of the present invention.

FIGS. 5 and 6 respectively show an apparatus 72 to control the POD during fiber draw, and the function thereof, according to one embodiment of the present invention. As illustrated in FIGS. 5 and 6, the apparatus 72 includes the apparatus 71 for applying coating and for estimating the POD of a wet-on-wet optical fiber online, which includes a POD estimator 74. This apparatus 71 is the same as those described with respect to the POD calculations, above. The POD estimator 74 calculates the estimated POD 73 over a given length L of optical fiber. The estimated POD 73 is compared against a desired, or target POD 77, by a comparator 75 to generate the POD error 79. The POD error 79 is received by a coating controller 76 in electrical communication with the draw tower 78, which produces the optical fiber. More specifically, the coating controller 76 controls the coating functions of the draw tower 78, including providing adjustments to control the primary and secondary coating pressure, primary and secondary coating viscosity, glass temperature (collectively, 80), and other draw tower controls to impact the actual POD manufactured by the draw tower 78.

The coating controller 76 is operable to perform a number of adjustments to keep the actual POD within desired limits based on the POD error 79 provided by the comparator 75. For instance, because the glass temperature directly impacts the POD, the coating controller 76 can control the glass temperature during fiber manufacturing to ensure a desired POD. More specifically, adjustments to the glass temperature may be controlled by adjusting the helium (He) flow rate used during optical fiber manufacturing. Although adjustments to the He flow rate are the preferred method for controlling the POD, the viscosity of the primary coating may also be changed by the coating controller 76 to impact the POD. Generally, the more viscous the primary coating material becomes, the lower the value of POD. Additionally, as will be appreciated by those of ordinary skill in the art, a combination of controls may be used to adjust the POD based on the calculated POD error 79.

After the draw tower 78 produces a length of fiber, the length of fiber produced 82 is provided to the POD estimator 74, which continues to estimate the POD produced by the draw tower 78. The calculation of POD error may occur on a regular timed basis, such as every second. Alternatively, the POD error may be calculated each time the consumed coating material is reduced by an operator-established amount, such as 0.05 grams.

It will be appreciated that one or more of the components illustrated in FIGS. 5 and 6 may be combinable and may be implemented by a computer or computer-programmable medium. For instance, the comparator 75 and coating controller 78 or POD estimator 74 mat be combined. Additionally, the coating controller 76 may be an integral component of the draw tower 78.

Many modifications and other embodiments of the inventions set forth herein will come to mind to one skilled in the That which is claimed:

1. A method for estimating and controlling optical fiber primary coating diameter during optical fiber manufacturing, comprising:

storing coating material in at least one tank;

applying the coating material to a glass fiber during optical fiber manufacturing;

providing at least one scale, upon which the at least one tank rests;

measuring, using the at least one scale, the difference in the weight of the coating material as it is consumed during the optical fiber manufacturing; and utilizing the measure of the weight of the coating material consumed during optical fiber manufacturing to estimate the primary outer diameter of the manufactured optical fiber.

2. The method of claim 1, further comprising the step of receiving, from a draw tower, a measure of the length of optical fiber manufactured.

3. The method of claim 2, wherein the primary outer diameter is estimated during wet-on-wet optical fiber manufacturing.

4. The method of claim 2, wherein the step of utilizing the weight of the coating material consumed during optical fiber manufacturing to estimate the primary outer diameter of the manufactured optical fiber comprises estimating the primary outer diameter of the manufactured optical fiber based at least in part upon the length of optical fiber manufactured and the weight of the coating material consumed during optical fiber manufacturing.

5. The method of claim 4, wherein the step of utilizing the weight of the coating material consumed during optical fiber manufacturing to estimate the primary outer diameter of the manufactured optical fiber comprises estimating the primary outer diameter of the manufactured optical fiber based at least in part upon an estimate of the diameter of the glass center of the optical fiber.

6. The method of claim 4, wherein the step of utilizing the weight of the coating material consumed during optical fiber manufacturing to estimate the primary outer diameter of the manufactured optical fiber comprises estimating the primary outer diameter of the manufactured optical fiber based at least in part upon an estimate of the diameter of the outer coating of the optical fiber.

7. The method of claim 4, further comprising the step of determining the error in the primary outer diameter of the manufactured optical fiber based upon a target primary outer diameter and the estimated primary outer diameter.

8. The method of claim 7, further comprising using the error in the primary outer diameter to control the primary outer diameter of the manufactured optical fiber.

* * * * *